Nov. 5, 1929.  B. H. SMITH ET AL  1,734,236
ELECTRICAL MEASURING INSTRUMENT CASING
Filed Aug. 22, 1928
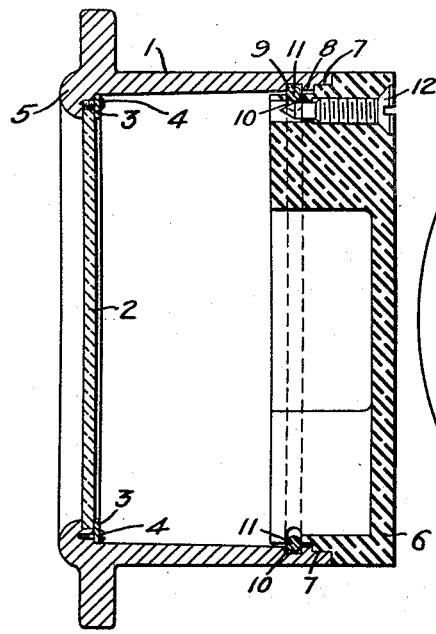
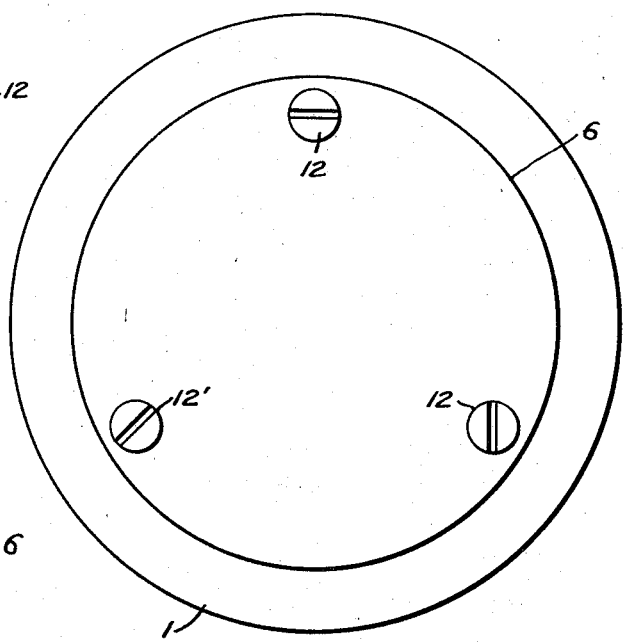
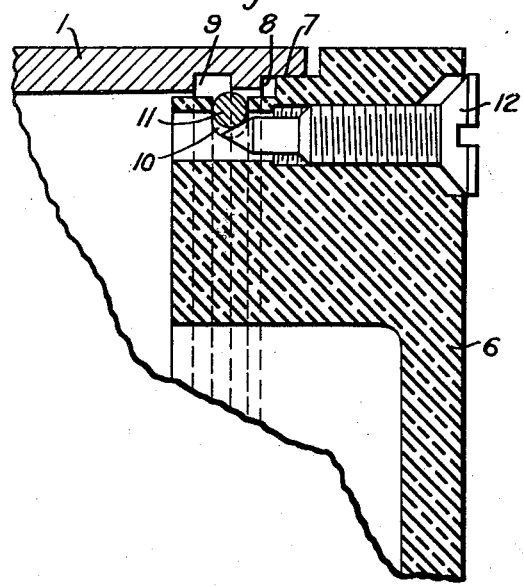
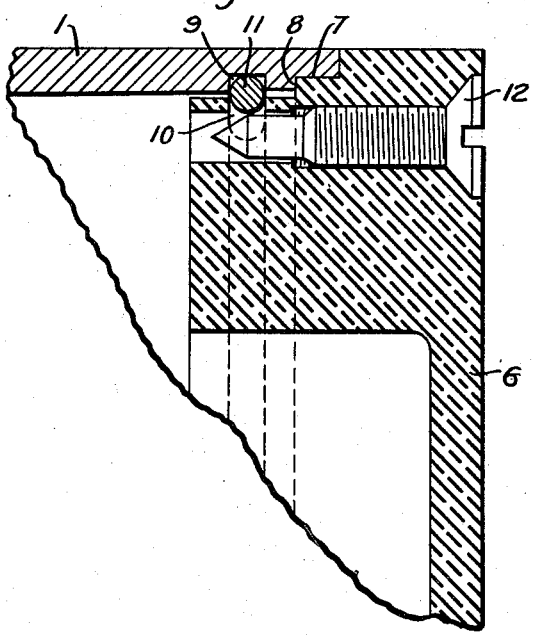
INVENTORS.
Benjamin H. Smith &
Clare Anderson.
BY
ATTORNEY Patented Nov. 5, 1929

1,734,236

UNITED STATES PATENT OFFICE

BENJAMIN H. SMITH, OF MAPLEWOOD, AND CLARE ANDERSON, OF NEWARK, NEW JERSEY, ASSIGNORS TO WESTINGHOUSE ELECTRIC AND MANUFACTURING COMPANY, A CORPORATION OF PENNSYLVANIA

ELECTRICAL-MEASURING-INSTRUMENT CASING

Application filed August 22, 1928. Serial No. 301,258.

Our invention relates to electrical measuring instruments and more particularly to casings for housing such instruments.

An object of our invention is to so improve the design of electrical-instrument casings that the leakage path between certain parts is greatly increased and is therefore less likely to break down than have those in casings heretofore used.

A further object of our invention is to provide means for retaining a cover plate in proper position in the back of an instrument casing in such manner that the casing is not distorted and a dust-proof seal is provided between said plate and said casing.

These and other desirable and useful objects are set forth in the following description considered in conjunction with the accompanying drawing.

In the drawings:

Figure 1 is a view, in vertical section, of the casing of an instrument constructed in accordance with our invention, Fig. 2 is a view, in rear elevation, of the casing shown in Fig. 1, Fig. 3 is an enlarged detail view of a portion of the casing illustrated in Fig. 1, showing one position of the retaining and sealing means constructed in accordance with my invention, and Fig. 4 is a view, similar to Fig. 3, showing another position of the retaining and sealing means.

Heretofore, in instrument casings of the type described, the circular disc or plate for closing the back of the hollow cylindrical housing was held in position by screws that were threaded to the periphery of the plate and passed through holes in the wall of the housing. Such construction distorted the circular wall of the housing since spaced points on the cylindrical housing were tightly clamped to the circular closure plate, and this condition was aggravated when the respective diameters of the plate and housing were not exactly equal. Such distortion of the housing resulted in openings between the plate and the housing intermediate the positions of the screws, thereby permitting dust to enter the casing to the injury of the instrument housed therein.

Further, when such instruments were mounted in steel or other metallic panel boards, the leakage distance between the screws and the metallic board was short and was subject to breakdown when subjected to an abnormal voltage. Neither of the above mentioned undesirable features of casings of the prior art is present in the casing constructed in accordance with our invention.

According to our invention, the casing comprises a hollow cylindrical housing 1 for the protection of an instrument, such as an electrical measuring instrument (not shown). The front of the housing 1 is provided with the usual glass cover 2 secured thereto in a conventional manner by means of an annular member 3 which is held in position by screws 4 threaded to the inner periphery of a flange 5.

The back of the housing 1 is provided with a disc or plate 6, preferably of an insulating material, such as hard rubber. The outer periphery of the plate 6 has three diameters, the middle portion 7 being such diameter as to closely fit the inner surface of the outer ends of the housing 1 which terminates in a shoulder 8 to be engaged by the plate 6.

Annular grooves 9 and 10 are cut in the inner surface of the cylindrical wall of the housing and in the outer periphery of the closure plate 6, respectively, for the reception of a retaining and sealing ring 11, as hereinafter described.

The grooves 9 and 10 are so disposed that, when the plate 6 is in operative position, they are in registration to constitute a substantially closed annular chamber.

The sealing and retaining ring 11 may be of steel or similar spring material and is interrupted at one place so that it may be expanded. In its unexpanded position, however, it is so proportioned that it is completely contained within the groove 10 in the plate 6.

A plurality of bosses, three in the present embodiment, are formed on the plate 6, each of which is provided with a threaded opening extending therethrough into communication with the groove 10. Screws 12 having tapered ends are received by the threaded openings and, when in their inner positions, their tapered ends engage the retaining ring 11.

It is apparent that, when the screws are forced inwardly, their tapered ends will engage the ring 11 and expand it to a position where it will be partially within the groove 9 to thereby prevent relative movement between the housing 1 and plate 6.

Fig. 3 shows the relative positions occupied by the ring 10 and the screws 12 while the plate 6 is being moved into position, and Fig. 4 shows the relative position of such members after the screws 12 have been moved inwardly to force the ring 10 to occupy a position in the opening formed by the two grooves in the members 1 and 6. In such position, the plate 6 and the housing 1 are relatively immovable, thus providing a dust-proof seal between the housing chamber and the outer atmosphere.

In addition to the above mentioned desirable features of our invention, a further one results from the positioning of the screws 12 on the back of the assembled casing, whereby a leakage path of considerable length between said screws and a panel board on which the instrument may be mounted is afforded. It will also be noted that we have designed the casing so that the metallic members, i. e., the screws 12 and the ring 10, are completely surrounded or enclosed within the insulating material of the casing. The heads of the screws 12 are exposed, however, but because of the considerable distance between the screw heads and the outer periphery of the housing 1, this construction is not objectionable.

Terminal studs (not shown) may be mounted in the back plate 6, according to the usual practice, for conducting current to and from the measuring instrument mounted within the casing described.

It will be appreciated by those skilled in the art to which our invention pertains that various minor changes may be made therein without departing from the essence of our invention which we have endeavored to set forth in the accompanying claims.

We claim as our invention:

1. In combination, a hollow cylindrical casing for a measuring instrument, means for closing one end of said casing comprising a plate having a peripheral portion conforming in diameter and shape to an inner surface of said casing, said plate and said casing having annular grooves therein constituting an annular chamber, an expansible ring normally disposed in the groove in said plate, and means engaging said ring for expanding it to a position where it cooperates with both of said grooves to prevent removal of said plate.

2. In combination, a hollow cylindrical casing for a measuring instrument, means for closing one end of said casing comprising a plate having a peripheral portion conforming in diameter and shape to an inner surface of said casing, said plate and said casing having annular grooves therein, expansible means normally disposed in the groove in said plate, and means carried by said plate for expanding said expansible means to a position where it cooperates with both of said grooves to prevent relative movement between the casing and the plate.

3. In combination, a hollow cylindrical casing for a measuring instrument, means for closing one end of said casing comprising a plate having a peripheral portion conforming in diameter and shape to an inner surface of said casing, said plate and said casing having annular grooves therein, expansible means normally disposed in the groove in said plate, and means carried by said plate for expanding said expansible means to a position where it cooperates with both of said grooves to prevent relative movement between the casing and the plate, said means comprising screws having tapered ends disposed to engage the inner periphery of said expansible means.

4. In combination, a hollow casing for a measuring instrument, means for closing one end of said casing comprising a plate having a peripheral portion conforming in diameter and shape to an inner surface of said casing, said plate and said casing having grooves formed therein for cooperation to constitute an annular chamber when said plate is in operative position, a resilient ring normally contained within the groove in said plate, and means for forcing said ring into a position where it is partially disposed in the groove in said casing.

5. In combination, a plurality of coacting casing members having contacting surfaces, grooves in said surfaces disposed to be in registry when said members are in their operative positions, means normally cooperating with the groove in only one of said members, and means engaging said first means for forcing it to a position where it cooperates with both of said grooves to retain said members in relatively fixed relation.

6. A casing for an instrument comprising a hollow body having an annular groove in its inner surface, a plate having an outer peripheral portion conforming to an inner surface of said body and an annular groove in another peripheral portion for coaction with the annular groove in said hollow body, a spring member disposed within one of said annular grooves, and screws for forcing said spring member into a position where it cooperates with both of said grooves to maintain said hollow body and said plate in fixed relation.

7. In combination, a casing having a groove and an end plate for said casing also having a groove to register with the groove in the casing when said plate is in its normal position, said plate having a shoulder to engage the end of said casing, of means for retaining said plate in its normal position including a resilient member within one of said grooves and means for forcing said member partially into the other of said grooves.

In testimony whereof, we have hereunto subscribed our names this 18 day of August, 1928.

BENJAMIN H. SMITH.
CLARE ANDERSON.